(12) United States Patent
Kirn et al.

(10) Patent No.: US 12,109,661 B2
(45) Date of Patent: Oct. 8, 2024

(54) TOOL HOLDER HAVING AT LEAST ONE SENSOR

(71) Applicant: WTO Vermögensverwaltung GmbH, Ohlsbach (DE)

(72) Inventors: Matthias Kirn, Durbach (DE); Sascha Tschiggfrei, Ohlsbach (DE); Hanjo Mauch, Lahr-Sulz (DE); Karlheinz Jansen, Schutterwald (DE)

(73) Assignee: WTO Vermögensverwaltung GmbH, Ohlsbach (DE)

( * ) Notice: Subject to any disclaimer, the term of this patent is extended or adjusted under 35 U.S.C. 154(b) by 436 days.

(21) Appl. No.: 17/771,599

(22) PCT Filed: Oct. 1, 2020

(86) PCT No.: PCT/EP2020/077518
§ 371 (c)(1),
(2) Date: Apr. 25, 2022

(87) PCT Pub. No.: WO2021/089252
PCT Pub. Date: May 14, 2021

(65) Prior Publication Data
US 2022/0410331 A1    Dec. 29, 2022

(30) Foreign Application Priority Data
Nov. 8, 2019    (DE) .................... 10 2019 130 162.9

(51) Int. Cl.
*B23Q 17/09*    (2006.01)
(52) U.S. Cl.
CPC .... *B23Q 17/0952* (2013.01); *B23Q 2717/006* (2013.01)

(58) Field of Classification Search
CPC ................ B23Q 17/0952; B23Q 17/09; B23Q 2717/006; B23Q 2717/00
See application file for complete search history.

(56) References Cited

U.S. PATENT DOCUMENTS

| | | |
|---|---|---|
| 6,370,789 B1 | 4/2002 | Madlener et al. |
| 9,981,319 B2 | 5/2018 | Fronius |
| 2009/0234490 A1 | 9/2009 | Suprock et al. |

FOREIGN PATENT DOCUMENTS

| | | |
|---|---|---|
| DE | 299 23 695 U1 | 2/2001 |
| DE | 102004040407 A1 | 3/2016 |
| DE | 102014116861 A1 | 5/2016 |
| DE | 102015005718 A1 | 11/2016 |
| EP | 0337669 B1 | 10/1989 |
| EP | 18785535 A1 | 1/2008 |
| WO | WO2005/063437 A1 | 7/2005 |
| WO | WO2014/195054 A1 | 12/2014 |
| WO | WO2018/099697 A1 | 6/2018 |

*Primary Examiner* — Alan Snyder
(74) *Attorney, Agent, or Firm* — ASLAN LAW, P.C.

(57) ABSTRACT

A tool holder having at least one sensor and a transmission device for transmitting the data captured by the sensor to a higher-level controller. The power supply to the sensor or the data module can be interrupted without contact when the tool holder is removed from the machining space of a machine tool. This prevents, for example, the power supply from being discharged while the tool holder is in a magazine outside the machine, and, for example, significantly increases the availability and service life of the tool holder before a battery is replaced, and/or before the accumulator and/or charge storage device is recharged.

16 Claims, 6 Drawing Sheets

TOOL HOLDER HAVING AT LEAST ONE SENSOR

CROSS-REFERENCE TO RELATED APPLICATIONS

This application claims priority to DE Patent Application No. 10 2019 130 162.9 filed on Nov. 8, 2019, and this application claims priority to and is a 371 of international PCT Application No. PCT/EP2020/077518 filed on Oct. 1, 2020, the entire contents of which are hereby incorporated by reference.

Tool holders are used in a wide variety of machine tools, such as lathes, milling machines and machining centers. They are the link between the actual cutting tool (indexable insert, drill bit, milling cutter, etc.) and the machine tool. Tool holders can also be assembled from different modules in the manner of a modular construction kit. In this case, one of the modules is often referred to as a "tool adapter," "boring bar" or "extension," and another module as a "tool holder." However, these differences in naming are immaterial with regard to the claimed invention; what is important is their function as a link between the machine tool and the cutting tool.

Both driven and stationary (fixed) tool holders exist. Driven tool holders have at least one positioning axle and/or spindle which imparts the (rotating, lifting and/or oscillating) movement to the tool (drill bit, milling cutter, tap, whirling ring, planer, etc.) required for machining the workpiece. The drive itself can be integrated into the tool holder; for example in the form of an electric motor, a turbine or a piezoelectric element. The drive can also be arranged outside of the tool holder. Many machine tools provide an external drive for the tool holder. Examples include the spindle of a machine tool, or the drive inside a turret. In the latter case, the external drive and the spindle or the drive shaft of the tool holder are connected via a detachable coupling.

Stationary tool holders are tool holders without a positioning axle and without a spindle. The fixed tool, such as a boring bar, is attached to the tool holder.

In order to increase the productivity and quality of a machining process, it is known to equip tool holders with sensors. Tool holders with sensors are known from DE 10 2014 116 861 A1 and WO 2018/099697 A1. The sensors are used to record operating data or status data. Operating data can be, for example, the speed of the spindle, temperature(s), oscillation values, and the pressure of the coolant. The status of the tool holder can be detected, for example, by capturing a coolant leak and/or vibrations. The demarcation between operating data and data that capture the status of the tool holder is not always clear. Vibrations can indicate a blunt tool, a defective spindle bearing, or a defective transmission element (e.g., a defective gear).

The (raw) data captured by the sensor(s) is (optionally) first processed and then transmitted, preferably wirelessly, to an external receiver. Electrical energy, which is usually provided by a battery, is required to capture and transmit the data. The space available for the battery in or on the tool holder, and thus also its capacity, are limited.

A stand-by circuit is known from DE 10 2014 116 861 A1 for the purpose of reducing power consumption. Switching between the operating and standby states can be performed taking into account the sensor signals, such as the speed or oscillation signals. By means of the stand-by circuit, the power consumption is reduced during the times when no data is being captured. In order to detect a change in the operating state, however, the electronics must also be supplied with energy during standby operation, which puts a load on the battery.

Tool holders for machine tools are not usually in constant use. If a tool holder is not required, it is often stored outside of the machine in a magazine for several days, or even weeks. After that, the battery is very often completely or at least mostly discharged, and must be replaced. In practice, this repeatedly leads to problems and reduced productivity.

The invention is based on the object of specifying a tool holder which overcomes the disadvantages of the prior art. In particular, the tool holder should be robust and reliable.

This object is achieved with a tool holder comprising a housing and a receptacle for a tool, as well as a data module and a power supply, wherein the data module comprises at least one sensor for capturing operating and/or status data, and comprises a transmitter for transmitting the data to a receiver, wherein the tool holder has a switching unit which electrically connects the data module to the power supply or disconnects the data module from it, and wherein the switching unit is designed in such a manner that it is actuated without contact through the wall of the housing and/or a cover.

The contactless actuation of the switch according to the invention, through the wall of the housing or a cover, makes it possible to reliably protect the interior of the housing against the cooling lubricant and against the chips that inevitably are produced during the machining of a workpiece. There is also no weakening of the structure of the housing, such that the mechanical stability and rigidity of the tool holder remain high.

Switching off or disconnecting the power supply from the data module ensures that when the switching unit is open, and the tool holder is not in use, no more current flows, and the energy storage device or charge storage device of the power supply does not discharge. The energy storage device or charge storage device (charge storage device) of the power supply can be a non-rechargeable battery or a rechargeable accumulator, and/or another type of rechargeable charge storage device. The invention can be used together with batteries and accumulators, or all other types of rechargeable charge storage devices (such as, for example, lithium-ion batteries, supercapacitors, nickel-cadmium batteries, lead batteries). For reasons of linguistic simplification, the various charge storage devices are subsumed under the generic term "accumulator."

Switching off or disconnecting the power supply from the data module, as according to the invention, makes it possible to store the tool holder for weeks or even months without the energy storage device or charge storage device of the power supply becoming discharged. In other words, the tool holder according to the invention is ready for use immediately after it has been removed from a storage location or magazine. In addition, the service life of a battery is significantly increased and the replacement of a discharged battery with a new battery is significantly less necessary. The term "service life" is used to mean the length of time between installing a new battery and replacing it because it has become discharged. An extended service life increases the availability and significantly reduces the operating costs of the tool holder. In addition, reliable operation of the sensors during the machining of a workpiece is ensured.

In the context of the invention, "contactless" means that the switch can be arranged inside the housing, and no opening in the housing is required. This is particularly advantageous because tool holders are used in the working space of a machine tool, and are exposed to the harsh conditions prevailing there. The conditions in the working space are characterized by the constant exposure to cooling lubricants (cutting oils, cooling lubricant emulsions), vibrations, temperature fluctuations and, of course, the chips produced during processing.

Very high demands are therefore placed on a conventional mechanical switch that is actuated by hand in terms of its seal, mechanical stability, and temperature resistance. This leads to a high space requirement and high costs. "Elastic covers" in the form of a (metallic) membrane, which can be used to actuate a mechanical switch without opening the outer wall of a housing, also lead to mechanically complex and insufficiently robust constructions.

The solution according to the invention is very simple in structure. In a particularly simple form, the switching unit is designed as a reed switch. A reed switch is a switch that is actuated by an externally applied magnetic field. Such reed switches have proven themselves many times over for decades. They are available very inexpensively in a wide variety of designs and for a wide variety of switching currents, and allow a very large number of switching operations.

According to an advantageous embodiment of the invention, the reed switch is designed as an opener (normally closed (NC)). In this embodiment, the reed switch opens when a permanent magnet is brought close to it. This is different from conventional reed switches. Conventional reed switches close as soon as a suitable permanent magnet is brought close to them.

According to a further advantageous embodiment of the invention, the reed switch is designed as a changeover contact (single pole double throw (SPDT)). In this embodiment, the switching position of the reed switch (open or closed) is changed once by an externally applied magnetic field.

In a further embodiment of the invention, it is also possible to design the switching unit as a wireless switch, or a switch which is actuated by electromagnetic waves or fields. There is a large number of possible circuit variants for this, which are known to the person skilled in the relevant art.

In a further embodiment of the invention, the switching unit comprises an electrically actuatable switch, wherein the switching unit which is used to switch the electrically actuatable switch is supplied with electrical energy wirelessly by a transmitter located outside of the tool holder. In this case, electrical energy is transmitted without contact from the transmitter to the switching unit, by means of electromagnetic waves. Advantageously, the switching unit draws all of the energy required to actuate the switch via the transmitter, such that no additional power supply, such as a battery, is required to actuate the switch. The electrical energy is supplied, for example, by means of RFID technology (radio frequency identification). The transmitter generates alternating magnetic fields or emits high-frequency radio waves. A known transmission standard based on RFID technology is known, for example, under the designation NFC (near field communication).

RFID technology is an example of so-called energy harvesting. This means the generation of small amounts of electrical energy to supply mobile devices or sensors. The structures used for energy harvesting are also referred to as "nanogenerators." The tool holder according to the invention can also be equipped with one or more nanogenerators or generators. These serve to generate the electrical energy required by the data module and/or the sensors. The energy generated by the (nano) generator can also be temporarily stored in a rechargeable energy storage device or charge storage device (accumulator).

Advantageously, the electrically actuatable switch is configured such that the switch remains in its selected position when the power supply to the transmitter is interrupted.

In a further embodiment of the invention, the switching unit includes a receiver for receiving the electrical energy emitted by the transmitter, in particular by means of electromagnetic waves.

The transmitter is arranged outside of the tool holder, whereas a receiver is part of the switching unit and receives the signals from the transmitter and, depending on the signals, establishes or disconnects the electrical connection between the power supply and the data module.

In an embodiment according to the invention, the data module includes a rotation speed sensor or angle of rotation sensor, at least one temperature sensor, an acceleration sensor, a microphone and/or a sensor for capturing the state of charge of the power supply or of its charge storage device.

By means of the temperature sensors, for example, the temperature in the vicinity of the tool can be captured. From this, conclusions can be drawn about the load on the tool and its wear. The acceleration sensors or the acceleration sensor is used to detect any vibrations (chattering) of the tool that may occur. In addition, defects in driven tool holders, for example in the bearing of the spindle or the mechanical transmission elements, such as gear components, can be detected. In a similar way, it is also possible to use microphones, which capture the noise generated inside the housing, to allow for making deductions about the bearing or the mechanical transmission elements and the operating condition and/or the condition of the tool via corresponding evaluations.

By capturing the state of charge of the power supply, it is possible to effectively prevent the failure of the data module or the sensor system while a workpiece or a series of workpieces is being machined. If an insufficiently charged power supply is detected, this can be brought to the attention of the machine operator via a corresponding display. They can then either replace the power supply (battery), charge the accumulator and/or charge storage device, or use an operational replacement tool holder with a sufficiently charged power supply in place of the tool holder with a discharged power supply.

In a preferred embodiment of the invention, the data module comprises an evaluation unit for evaluating and/or processing the data captured by the at least one sensor. As a result, the amount of data that has to be transmitted from the data module to a higher-level controller or the like is minimal. This makes the data transfer easier and more reliable. However, it is also possible to transmit the raw data from the sensors in unprocessed form to a higher-level controller or evaluation unit outside of the tool holder, and process it there.

If the data is processed within the tool holder, the energy consumption for the data module and for the transmission of the data to a higher-level controller ultimately decreases. This means that the service life of the battery, for the same capacity, is extended. In the case of an accumulator or charge storage device, the operating time increases (this is the time between two charging processes).

The data module and the power supply are housed in the housing of the tool holder or in a separate housing, but in any case are liquid-tight and protected against the ingress of chips. To enable exchanging the power supply, for example, a cover is preferably arranged on the housing of the tool holder or on the separate housing. This cover can be connected to the housing or the separate housing with a seal. Screw connections are particularly suitable, because they are high performance and can be tightened and loosened multiple times.

The separate housing and/or the cover are preferably made of a non-ferromagnetic material such as aluminum, plastic or ceramic. This makes it easier to actuate the switching unit, for example using a permanent magnet. The inductive charging of an accumulator or charge storage device is also easier with such a non-ferromagnetic housing wall than if the housing wall consists of a ferromagnetic material.

The power supply preferably consists of an accumulator and/or charge storage device. In this case, a receiving coil and a rectifier can be provided within the housing or the separate housing. Energy can be coupled into the system via the receiving coil from a transmitting coil positioned outside of the tool holder. The rectifier, usually equipped with charging electronics, converts the AC voltage of the receiving coil into a DC voltage suitable for charging the accumulator or the charge storage device. This is how the accumulator is charged.

Alternatively, the accumulator, the charge storage device, the data module and/or the sensor or sensors can be supplied with electrical energy by a nanogenerator or generator integrated into the tool holder. The power supply then serves as a buffer during operation. Its capacity can then be significantly smaller than with tool holders without a nanogenerator or generator.

It is possible, in conjunction with a sensor for capturing the state of charge of the accumulator and/or charge storage device when storing the tool holder in a magazine, to decide whether the accumulator and/or charge storage device should be charged as a precaution. Alternatively, it is also possible to charge the accumulator and/or charge storage device of the tool holder when it is removed from the magazine before it is used in a machine tool, such that the full capacity of the accumulator and/or charge storage device is available while the workpiece or a series of workpieces is processed.

In a first embodiment, the switch is actuated by a magnet that is located outside of the housing, and thus is behind the "partition," and interacts with a reed switch.

If a magnet is used to actuate the switching unit (reed contact), the invention also provides that the magnet remains on the tool holder, and thus outside the housing, during the de-energized state. Its magnetic effect opens the switch inside the housing and interrupts the electrical connection between the power supply and the data module.

Because a large number of the tool holders have a steel housing, the magnet can easily be positioned and held on this housing and in the vicinity of the reed switch. If this is undesirable, for example to prevent magnetization of the housing, at least part of the housing (for example, a cover) can be made of a non-ferromagnetic material (for example, aluminum, non-ferrous alloys, plastic or ceramic). This simplifies the switching action of the magnet in conjunction with the reed switch.

The holding function can still be ensured if, behind this part of the housing, there is a metal insert which is large enough to hold the magnet.

Alternatively, a housing of the power supply (battery or accumulator) made of ferromagnetic material (for example, steel) can also be used to attach the magnet.

With this construction, one is free in the selection of the material for the non-ferromagnetic part of the housing, and can create optimal framework conditions. The free choice of material means that the shielding effect of a metallic housing on a radio connection can be significantly reduced, at least by a partial non-metallic cover.

At the same time, a material with high wear resistance against the abrasive environmental conditions in the working space of the machine tool, such as a ceramic, can also be selected for this part of the housing.

In a second embodiment variant, the data module or a second electronic switching unit independent of it can be temporarily supplied with energy via electromagnetic waves or high-frequency radio waves (for example, RFID or NFC and, for example, with a mobile phone as a transmitter) and switched, as an electrically actuated switch, between the data module and the power supply (battery, accumulator, charge storage device, etc.) In this design, the electronics are constructed in such a way that the switch remains in its selected position if the power supply from the transmission is interrupted after the switching operation.

Further advantages and advantageous embodiments of the invention can be found in the following drawings, the description thereof and the claims.

DESCRIPTION OF THE EMBODIMENTS

Figure 1:
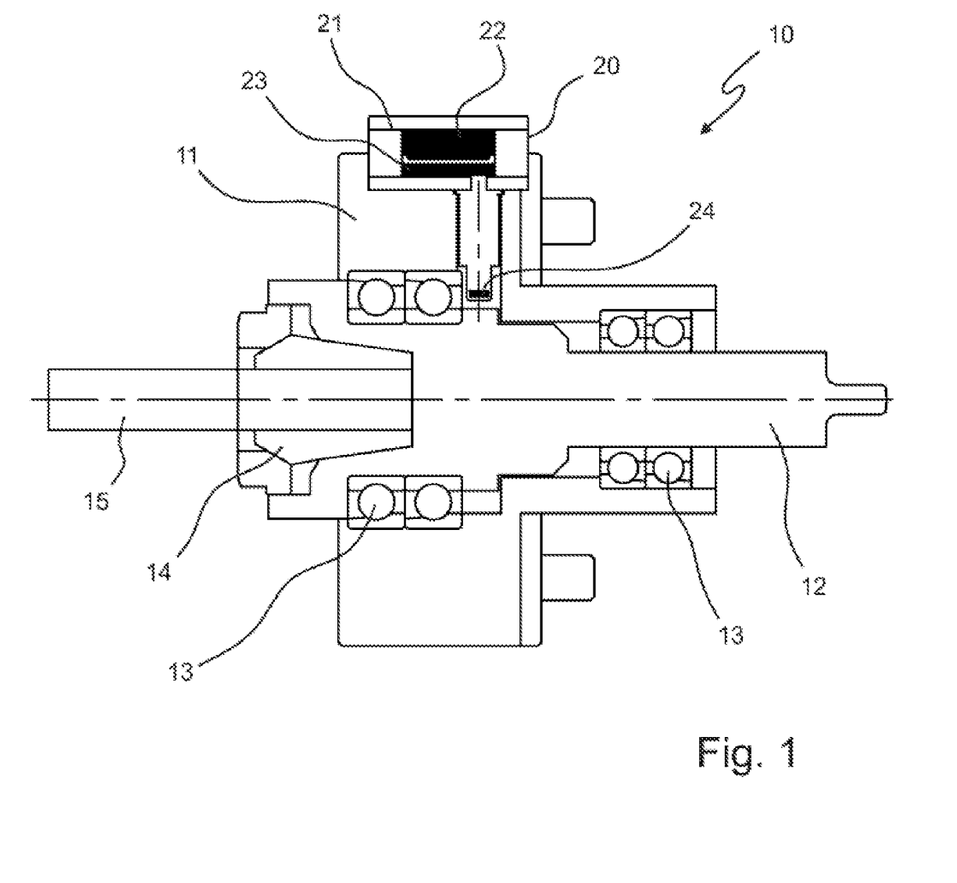
FIG. 1: is a driven tool holder according to the invention, greatly simplified and in longitudinal section.

FIG. 1 shows a driven tool holder 10 according to the invention. It comprises a housing 11 and a spindle 12. The spindle 12 is rotatably accommodated in the housing 11 via bearings 13. At the end of the spindle 12, on the left in the figure, there is a receptacle 14 for a tool 15—for example, a milling cutter or drill bit. The end of the tool holder 10, on the right in FIG. 1, is designed in such a way that it is compatible with a receptacle (for example, a turret) of a machine tool. At the right end of the spindle 12, a dihedron is formed. It is used to connect the spindle 12 to a drive shaft (not shown) of the machine tool in a rotationally fixed manner. So far, everything is well known to the relevant person skilled in the art.

In this exemplary embodiment, a separate housing 20 is attached to the housing 11 of the tool holder. It accommodates a data module 23 and a power supply 22, i.e., a battery, an accumulator or a further type of charge storage device. Alternatively, the data module 23 and the power supply 22 can also be accommodated in the housing 11 of the tool holder 10. A cover 21 is present on the separate housing 20 in this exemplary embodiment. The cover can be detached, for example by means of screws, and connected to the separate housing 20 in a liquid-tight manner. The screws and an optional seal are not shown. For the purpose of replacing the power supply 22, the cover 21 can be removed.

The data module 23 and the power supply 22 are electrically connected to each other via lines (not shown). A switching unit 26 according to the invention, that can be actuated without contact (see FIG. 4 and subsequent figures), is in the line.

The data module 23 includes at least one sensor for capturing operating and/or status data. A Hall sensor 24, shown as an example in FIG. 1, is used to detect the rotational speed of the spindle 12. The invention is not limited to this Hall sensor; rather, any conceivable sensors that are suitable for capturing operating data and/or the state of the tool holder 10 or tool 15 can be installed at a suitable point in or on the housing 11 of the tool holder 10, the spindle 12 and/or the separate housing 20.

The data module 23 can also include an evaluation unit which evaluates the output signals or data captured by the at least one sensor for the purpose of capturing operating and/or status data.

The housings 11, 20 and the housing cover 21 can be made of different materials. In general, the housing 1 is made of steel; the separate housing 20 and the housing cover 21 can also be made of a ferromagnetic material, or of aluminum, a mineral material, or a preferably fiber-reinforced plastics material.

Figure 2:
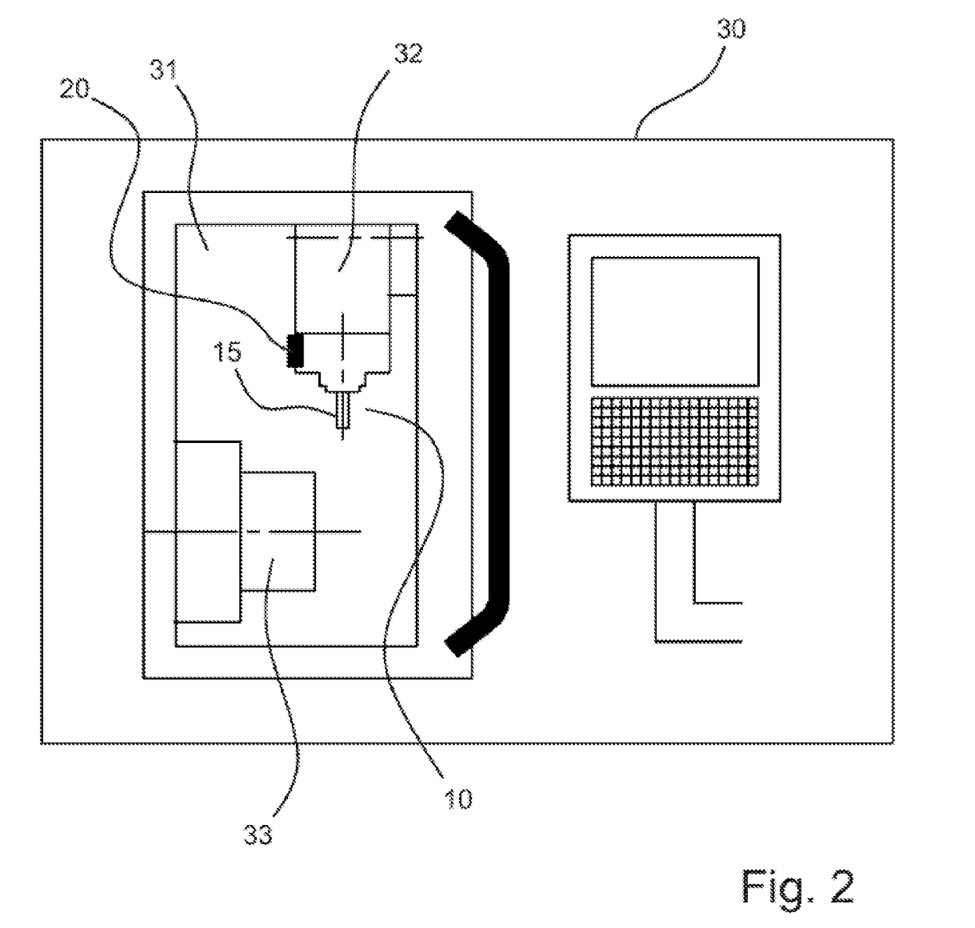
FIG. 2: is the tool holder according to FIG. 1 in a machine tool.

FIG. 2 shows a highly simplified machine tool 30. The tool holder 10 according to the invention is situated in its working space 31. In this case, it is attached to a receptacle 32 for tool holders. A workpiece 33 is machined by the cutting tool 15. The separate housing 20 is visible in FIG. 2; it accommodates the data module 23 and the power supply 22 as described above. If the tool holder 10 is situated in the working space 31 of a machine tool 30, then the data module 23 and the sensors connected to it (not shown) must be supplied with electrical energy from the power supply 22. This means that a switching unit 26 according to the invention arranged between the data module 23 and the power supply 22 is closed, such that the data module 23 is electrically connected to the power supply 26 and is supplied with electrical energy by it.

Figure 3:
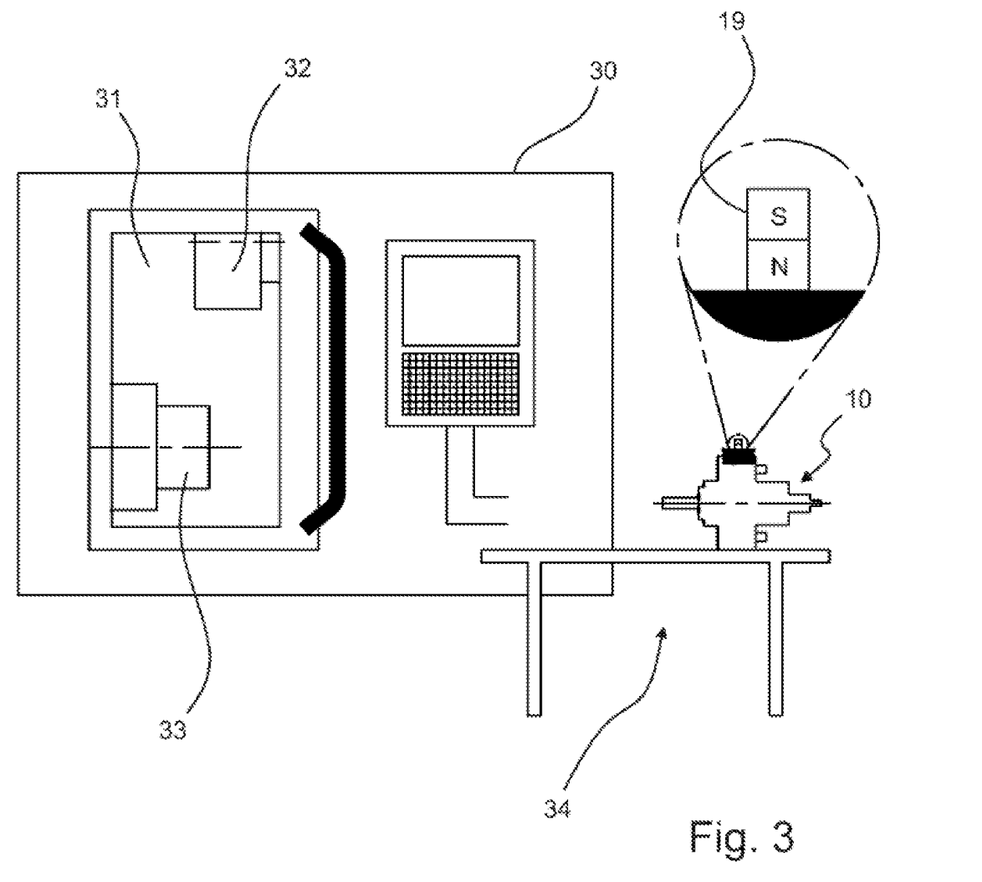
FIG. 3: is the tool holder according to FIG. 1 in a magazine.

FIG. 3 shows the machine tool 30 without the tool holder 10. The tool holder 10 is located outside the machine tool 30 in a storage location 34. The electrical connection between the power supply 22 and the data module 23 or the sensors should be interrupted there in order to prevent the power supply 22 from being discharged.

A switching unit 26 is integrated into the tool holder 10 according to the invention, and can be designed, for example, as a reed switch. A reed switch is actuated by creating a magnetic field. Normally, the reed switch closes when placed in a magnetic field.

In the tool holder according to the invention, the reed switch is preferably designed as an opener (normally closed (NC)). This means that it opens when it is in a suitably aligned magnetic field with sufficient field strength.

A (permanent) magnet 19 is attached to the tool holder 10. The position and alignment of the magnet 19 relative to the reed switch are selected in such a way that the reed switch opens, and the power supply 22 is electrically isolated from the data module 23 and the sensors. This effectively prevents the power supply 22 from discharging. The magnet 19 is preferably embedded in a clearly visible cover made of plastic or another non-ferromagnetic material. This enables a very simple and effective visual check as to whether the power supply has been interrupted for all tool holders 10 located in the storage 34. If, on one of the tool holders 10, one of the magnets 19 does not have a—for example—red, covering, this is immediately apparent, and the missing magnet 19 can be attached.

In the case of an automated storage, the presence of the magnet 19 during storage can be detected via the magnetic field of the magnet 19. If the magnet 19 is missing, a corresponding signal can be issued, and/or entry into the storage can be refused.

The function of the switching unit according to the invention will be explained using the example of a reed switch 26, with reference to FIGS. 4 to 6. As can be seen from FIG. 4, the data module 23 is electrically connected via lines 25 to the power supply 22 in the form of a battery and/or an accumulator and/or a further type of charge storage device. A switching unit 26 is installed in one of the lines 25. The data module 23, the lines 25, the power supply 22 and the switching unit 26 are located within the housing or housings 11, 20 and the cover 21, and are sealed off from the environment in a liquid-tight manner.

Figure 4:
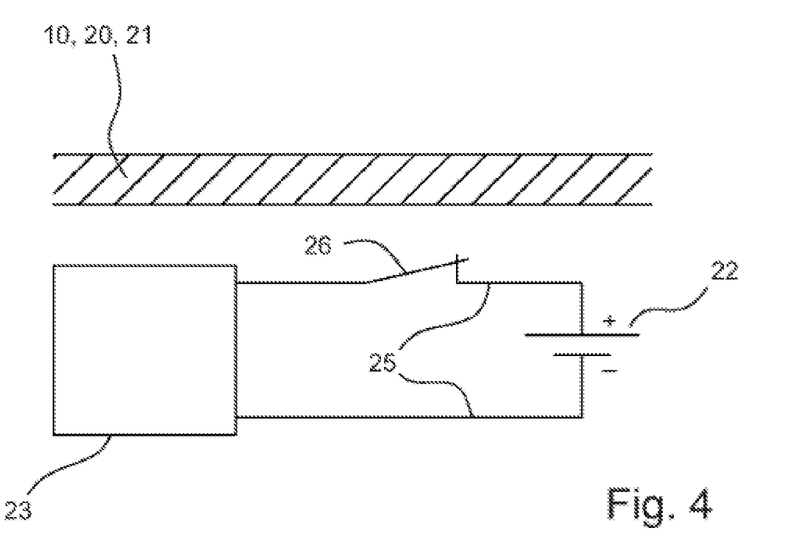
FIGS. 4 and 5: show an embodiment of an interruption of the power supply according to the invention, in two switching states.

The switching unit 26 is closed in FIG. 4, such that the power supply (battery and/or accumulator and/or further type of charge storage device) and the data module 23 are electrically connected to one another. The data module 23 and the sensors connected to it (not shown) are in operation. The operating state can be a standby operation. In this switching position, the tool holder 10 is usually located in the working space 31 of the machine tool 30, as shown in FIG. 2.

Figure 5:
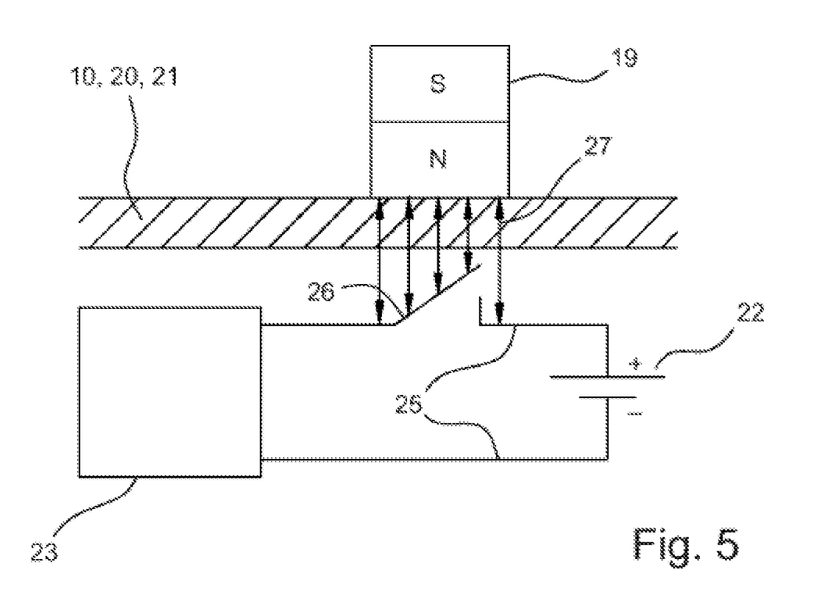

FIG. 5 shows the same structure as FIG. 4, but the tool holder 10 is located outside of the working space 31 of the machine tool 30. A magnet 19 is arranged on the outside of the tool holder 10, the housing 20, and/or 11 in such a way that the field lines of the magnetic field it generates open the switching unit 26—in this case, a reed switch. As a result, the circuit is interrupted between the power supply 22 and the data module 23.

If the housing 20, 11 is made of a ferromagnetic material, then the magnet 19 is held on the housing (20 and/or 11) by the magnetic effect (illustrated by the double arrows 27 in FIG. 5).

Figure 6:
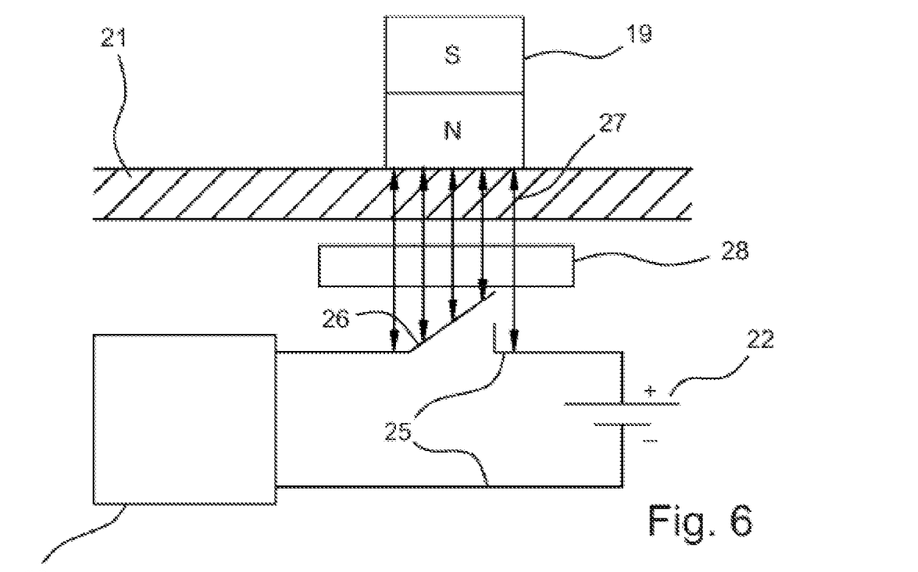
FIGS. 6 to 8: are further exemplary embodiments of an interruption of the power supply according to the invention.

FIG. 6 shows a construction similar to that of FIG. 5. In this case, the cover 21 is made of a non-ferromagnetic material. In order to still be able to hold the magnet 19 on the cover 21 by means of magnetic force, there is a ferromagnetic component 28 inside the housing 11. Due to the magnetic effect 27 between the magnet 19 and the component 28, the magnet 19 is held firmly enough on the cover 21 that it does not fall down "on its own." The component 28 can be a part—for example, the housing—of the power supply 22.

For this purpose, the four components 28, 26, 21 and 19 mentioned are adapted to each other in terms of their dimensions, shapes and geometric arrangement, in such a manner that the magnet 19 can actuate the switching unit 26.

In an advantageous embodiment of the invention, the magnetic field generated by the permanent magnet 19 is also used to hold the magnet 19 on the tool holder 10—more precisely, the housing 20, 11 and/or the cover 21. In this way, the magnet 19 is fixed to the tool holder 10 securely, sufficiently firmly and, if required, in a manually detachable manner, without any additional structural complexity.

It is of course also possible to attach the magnet 19 to the housing 11, 20 and/or the cover 21 in a different way, for example by means of a detachable snap connection, or quite simply by means of a (conspicuously colored) rubber band or a band with a Velcro fastener.

Figure 7:
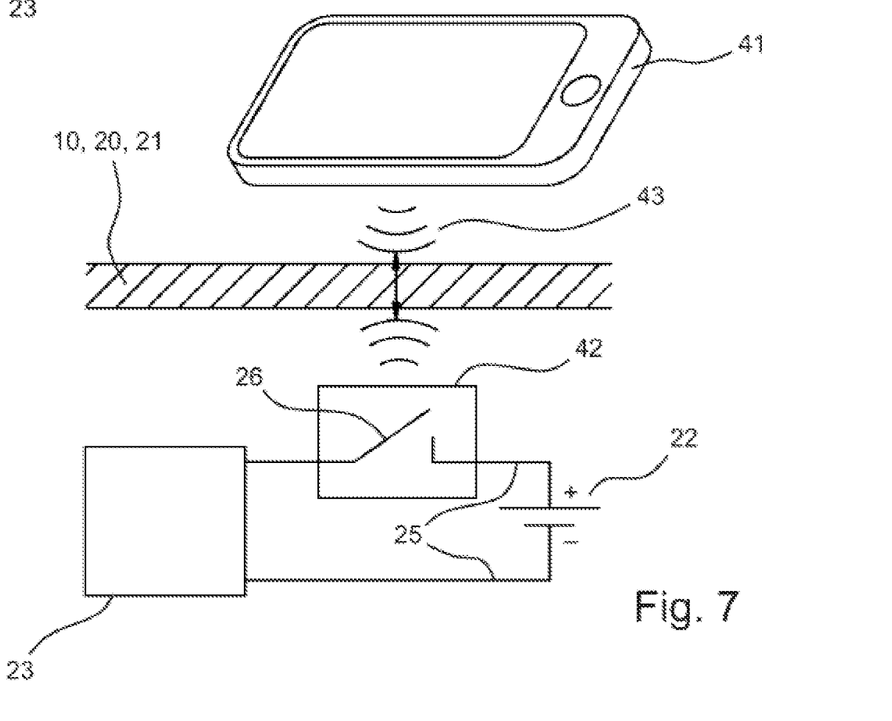

FIG. 7 shows a structure similar to that of FIGS. 5 and 6. In this embodiment, the switching unit 26 comprises an electrically actuatable switch, wherein, in order to switch the electrically actuatable switch, the switching unit 26 is supplied with electrical energy wirelessly by a transmitter 41 located outside the tool holder. In this case, electrical energy is transmitted without contact from the transmitter 41 to the switching unit 26 by means of electromagnetic waves or fields (keyword: energy harvesting). The transmitter 41 emits electromagnetic waves 43, for example in the form of high-frequency radio waves. According to the illustrated embodiment, the switching unit 26 comprises a receiver 42 for receiving the electromagnetic waves 43 emitted by the transmitter 41.

These electromagnetic waves 43 penetrate the wall of the housing 20, 11 and/or the cover 21 and reach the switching unit 26, which is thereby supplied with energy for actuating the switch. As a result, the switch of the switching unit 26 can be actuated. Advantageously, the electrically actuatable switch is designed in such a manner that the switch remains in its selected position when power from the transmitter 41 is interrupted.

The transmitter 41 is, for example, a device that generates electromagnetic waves, in particular a mobile phone, in particular a smartphone or a tablet.

Figure 8:
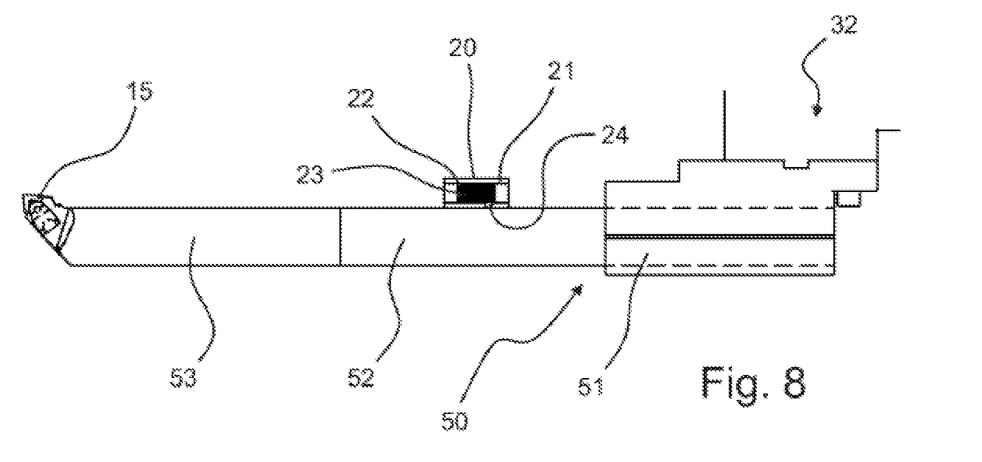

FIG. 8 shows a stationary tool holder 50 of modular construction according to the invention, which is composed of several tool holder modules 51, 52 and 53. A second tool holder module 52 (in this case, a boring bar) is accommodated in the receptacle of the first tool holder module 51. A third tool holder module 53 (in this case, an adapter) is fastened to the left-hand end of the boring bar and holds the cutting tool 15 (in this case, an indexable insert).

A separate housing 20 accommodating the data module 23, the power supply 22 and a sensor 24 is fastened to the boring bar 52. In this case, the sensor 24 can be an acceleration sensor, for example, in order to detect the oscillations of the tool holder 50.

As shown, the sensor or sensors can be integrated into the separate housing 20. It is also possible, however, for one or more sensors (not shown) to be arranged, for example, in the third tool holder module 53 in the immediate vicinity of the cutting tool 15. It can be advantageous to provide an acceleration sensor and/or a temperature sensor there.

For example, chattering of the cutting tool 15, and/or the wear thereof—can be detected by means of the acceleration sensor.

The temperature prevailing at the cutting tool 15 can be detected by means of the temperature sensor. The operating temperatures are an indicator of the stress on the cutting tool 15; if the temperatures rise, all other things being equal, this indicates that the cutting tool 15 is wearing out.

The signal can be transmitted from the sensor or sensors to the data module 23 via signal lines inside the tool holder modules 53 and 52.

Inside the separate housing 20, there is also a switching unit 26 according to the invention, which is not shown for reasons of clarity. By means of the switching unit, the power supply 22 can be electrically isolated from the data module 23 or connected to it in the manner described above.

Figure 9:
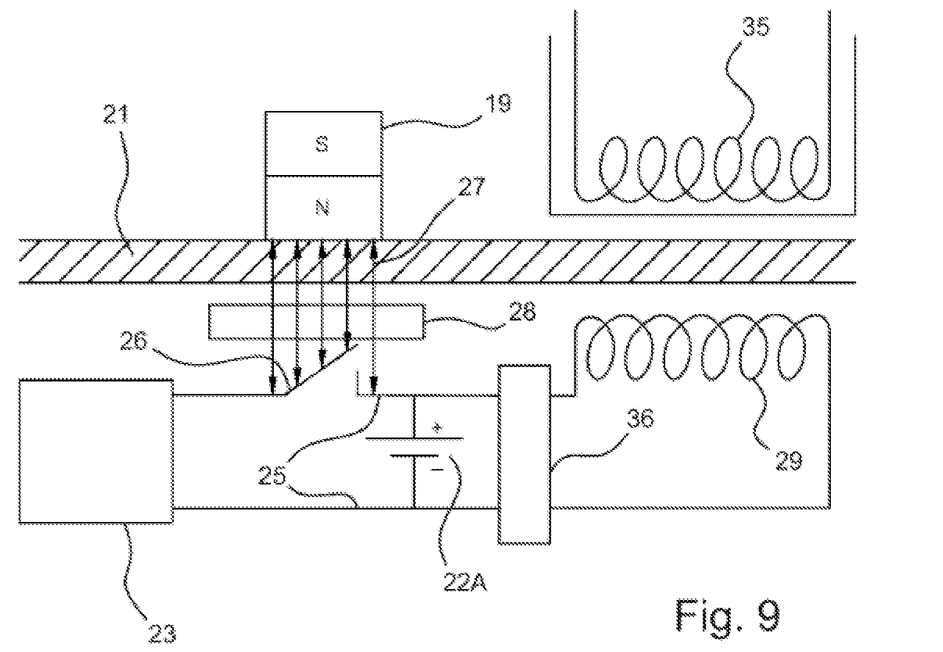
FIG. 9: shows further exemplary embodiments of tool holders according to the invention (with accumulator and/or charge storage device, and inductive charging).

A further embodiment is shown in FIG. 9. The power supply 22 is designed as a rechargeable accumulator and/or charge storage device 22A that can be charged inductively. FIG. 9 is based on FIG. 6; however, the inductive charging of the accumulator and/or charge storage device 22A can also be implemented in all other embodiments. Instead of the inductive charging, it is also possible to integrate a nanogenerator or a generator (not shown) into the tool holder. The nanogenerator or the generator generates electrical energy when the tool holder is operated. The data module 23 and/or the accumulator and/or the charge storage device 22A can be supplied and/or charged with this electrical energy.

The accumulator and/or the charge storage device 22A is indirectly connected to a receiving coil 29 which is located inside the separate housing 20, the housing 11, and/or the cover 21. It is therefore protected against cooling lubricant and chips to the same degree as the data module 23, the sensors, and the accumulator and/or the charge storage device 22A.

Since the receiving coil 29 emits alternating current, but the accumulator and/or the charge storage device 22A has to be charged with direct current, a rectifier is required, which is only shown schematically as a block 36 in FIG. 9.

The charging process takes place outside of the machine tool 30, for example at the storage location 34. A transmitting coil 35 is provided there. The transmitting coil 35 and the receiving coil 29 are positioned relative to one another in such a way that energy is transmitted from the transmitting coil 35 to the receiving coil 29 when the tool holder is in a correspondingly equipped storage location 34.

If the storage location 34 is provided with a transmitting coil 35, then all tool holders stored in such a storage location can be charged either on a regular basis or according to the state of charge of the accumulator and/or the charge storage device 22A. It is also possible for the accumulator and/or the charge storage device 22A to be charged before a tool holder is removed from the storage location 34, such that the full capacity of the accumulator and/or the charge storage device 22A is available for the upcoming machining process.

LIST OF REFERENCE SIGNS 10 tool holder
11 housing
12 spindle
13 bearing
14 tool holder
15 cutting tool
19 magnet
20 separate housing
21 housing cover
22 battery
22A accumulator/charge storage device
23 data module
24 sensor
25 line
26 switch
27 magnetic effect
28 magnetically acting component
29 receiving coil
30 machine tool
31 working space
32 receptacle for a tool holder
33 workpiece
34 storage location
35 transmitting coil
36 rectifier
41 transmitter
42 receiver
43 waves, fields
50 tool holder
51 first tool holder module
52 second tool holder module
53 third tool holder module

The invention claimed is:

1. A tool holder comprising:
a receptacle for a tool;
a data module;
a power supply, wherein
the data module has at least one sensor configured and/or programmed to capture operating and/or status data, and a transmitter configured and/or programmed to transmit the operating and/or status data to a receiver; and
a switching unit is capable of electrically connecting or disconnecting the data module to or from the power supply, wherein
the switching unit is designed in such a manner that the switching unit is actuated without contact,
the switching unit is a reed switch, and
the reed switch is designed to be actuated by a magnet located outside of the tool holder.

2. The tool holder according to claim 1, wherein the reed switch is designed as an opener or as a changeover contact.

3. A tool holder comprising:
a receptacle for a tool;
a data module;
a power supply, wherein
the data module comprises at least one sensor configured and/or programmed to capture operating and/or status data, and a transmitter configured and/or programmed to transmit the data to a receiver; and
a switching unit which is capable of electrically connecting or disconnecting the data module to or from the power supply,
the switching unit is designed in such a manner that the switching unit is actuated without contact,
the switching unit comprises an electrically actuatable switch, and
the switching unit is supplied wirelessly with electrical energy by a transmitter located outside of the tool holder.

4. The tool holder according to claim 3, wherein the switching unit comprises a receiver configured and/or programmed to receive the electrical energy emitted by the transmitter, by means of electromagnetic waves.

5. The tool holder according to claim 3, wherein the data module has a rotation speed or angle of rotation sensor, at least one temperature sensor, an acceleration sensor, a microphone, and/or a sensor for capturing the charge status of the power supply.

6. The tool holder according to claim 3, wherein the data module comprises an evaluation unit for evaluating and/or processing the data captured by the at least one sensor.

7. The tool holder according to claim 3, wherein the data module comprises a storage unit for storing the data captured by the at least one sensor and/or the data evaluated or captured by the evaluation unit.

8. The tool holder according to claim 3, wherein the data module and the power supply unit are accommodated in the housing of the tool holder and/or in a separate housing.

9. The tool holder according to claim 8, wherein the housing of the tool holder or the separate housing has a cover.

10. The tool holder according to claim 9, wherein the separate housing and/or the cover consists of a non-ferromagnetic material.

11. The tool holder according to claim 3, wherein the power supply unit is an accumulator and/or charge storage device.

12. The tool holder according to claim 11, further comprising:
a nanogenerator or a generator, wherein
the nanogenerator or the generator is configured and/or programmed to charge the accumulator and/or charge storage device.

13. The tool holder according to claim 12, wherein the nanogenerator or the generator at least partially supplies the data module with electrical energy during operation.

14. The tool holder according to claim 11, further comprising:
a receiving coil; and
a rectifier, wherein
the receiving coil is designed for coupling to a transmitting coil situated outside of the tool holder for the purpose of inductively charging the battery and/or charge storage device.

15. The tool holder according to claim 3, further comprising:
a housing and/or an additional housing, wherein
the data module and/or the power supply are accommodated in the housing or in the additional housing.

16. The tool holder according to claim 3, further comprising:
a plurality of modules.

* * * * *